A. J. CHANUT.
OPERATING DEVICE FOR WHIPS.
APPLICATION FILED APR. 14, 1914.
1,130,668.
Patented Mar. 2, 1915.
2 SHEETS—SHEET 2.
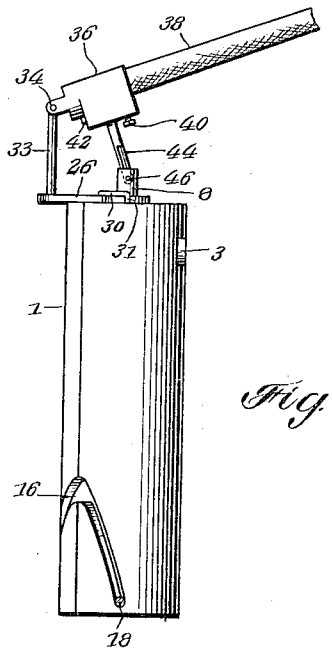
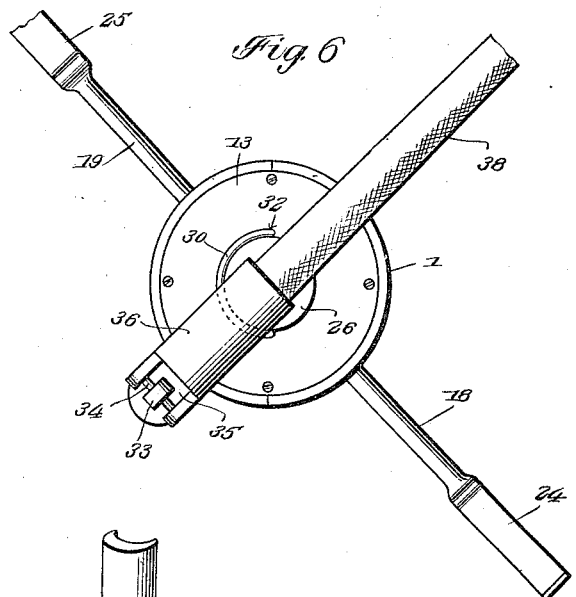
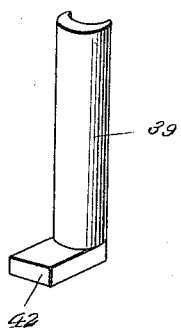
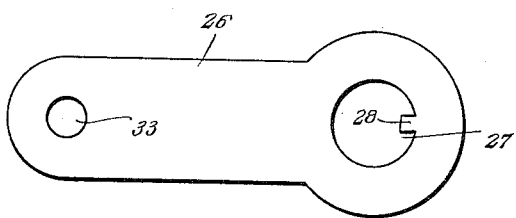
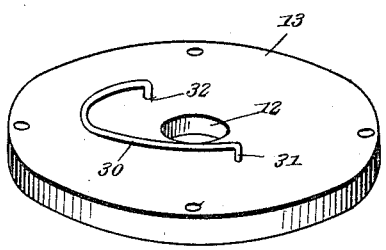
Inventor
A. J. Chanut,
Witnesses
J. H. Crawford
Dudley B. Howard
By Victor J. Evans
Attorney

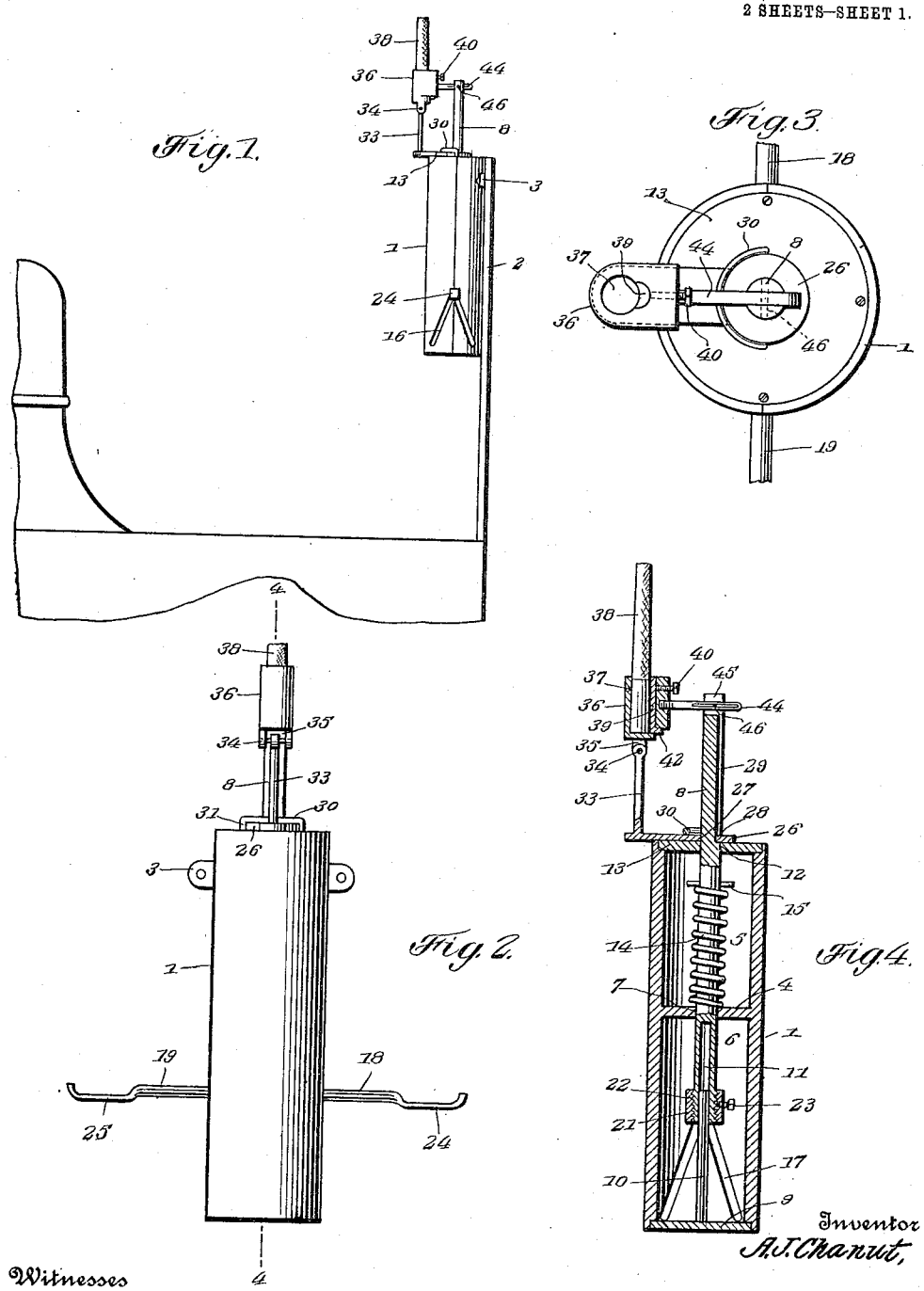

# UNITED STATES PATENT OFFICE.

AUGUSTE JOSEPH CHANUT, OF KENNEDY, SASKATCHEWAN, CANADA.

OPERATING DEVICE FOR WHIPS.

1,130,668.  Specification of Letters Patent.  Patented Mar. 2, 1915.

Application filed April 14, 1914. Serial No. 831,818.

*To all whom it may concern:*

Be it known that I, AUGUSTE J. CHANUT, a citizen of Canada, residing at Kennedy, in the Province of Saskatchewan and Dominion of Canada, have invented new and useful Improvements in Operating Devices for Whips, of which the following is a specification.

This invention relates to an operating device for the whips used by drivers of buggies, wagons, or like vehicles, the primary object being to provide a device of this character which is adapted to be mounted upon the dash-board of the vehicle and is provided with pedals by which movement may be imparted to means provided for operating the whip that is applied to the device, whereby the latter will be made to descend forcibly upon the draft animal hitched to the vehicle.

A further object of the invention is to provide a whip-operating device of the class described wherein two pedals are provided, together with means whereby, when one pedal is depressed by the foot, the whip will be oscillated through one path of movement, whereas, when the other pedal is actuated, the whip will descend in a path disposed at an angle to the first-named path. Therefore, when the device is disposed upon the dash-board centrally thereof, the whip may be made to operate upon either flank of the draft animal, if a single animal is being used, or to operate upon either of two draft animals, when driving double.

A still further object is the provision of a whip-operating device having means for detachably securing an ordinary driving whip thereto in such a manner that it may not be removed readily by unauthorized persons.

The invention consists in the features of construction, combination, and arrangement of parts, hereinafter fully described and claimed, reference being had to the accompanying drawings, in which:

Figure 1 is a side elevation of a portion of a vehicle, showing the whip-operating device mounted thereon, the whip being shown in its inoperative position and being broken away; Fig. 2 is a rear elevation of the device; Fig. 3 is a top plan view; Fig. 4 is a longitudinal sectional view on line 4—4 of Fig. 2; Fig. 5 is a side elevation of the device, showing the whip as being operated in one of its paths of movement; Fig. 6 is a top plan view of the same; Fig. 7 is a detail plan view of the supporting member; Fig. 8 is a detail perspective view of the top plate of the casing, showing the limiting member mounted thereon; and, Fig. 9 is a detail perspective view of the movable whip-securing jaw.

In the drawings, the numeral 1 designates a cylindrical casing which forms the body of the device and is shown as being mounted in a vertical position upon the inner face of the dash-board 2 of a vehicle, it being secured thereto by means of the attaching members 3. The casing 1 is provided medially with an interior wall 4 which divides the casing into upper and lower compartments 5 and 6, and the said wall is provided centrally with a circular opening 7 receiving a longitudinally slidable and rotatable operating shaft 8. A bottom plate 9 is secured by means of screws or the like to the lower end of the casing and is countersunk therein. A longitudinal guide pin 10 projects upwardly from the center of the bottom plate and is adapted for sliding engagement within a cylindrical recess 11 which is provided within the lower end of the shaft 8 concentric thereto. The upper end of the shaft projects through the circular opening 12 which is provided medially in a top plate 13 for the casing, this plate being counter-sunk likewise within the casing end and being secured by means of screws or like attaching members. A helical compression spring 14 is mounted upon the shaft 8 within the upper compartment 5 of the casing and between the casing wall 4 and the limiting pin 5 which extends transversely through the shaft. This spring is adapted normally to maintain the shaft in its uppermost, inoperative position.

The casing is provided adjacent to its lower end, in its opposite sides, with substantially inverted V-shaped slots 16 and 17 in communication with the lower compartment 6. The casing is split longitudinally so that its sections may be separated for the purpose of mounting the oppositely extending arms 18 and 19 of a pedal device within the respective slots 16 and 17 of the casing for movement therein. The pedal device is provided medially with an enlarged sleeve 21 which is threaded onto the lower end of the operating shaft, as at 22. The sleeve is adapted to be secured fixedly in applied position upon the shaft by means of a set screw 23. The outer ends of the arms of the pedal device are formed into foot-holds 24 and 25, which are disposed at the right and left of the casing, so that they may be engaged by corresponding feet of the driver. Therefore, when the driver presses the toe of his right foot upon the right-hand foot-hold 24, the corresponding arm of the device, which is normally maintained at the apex of the casing slot 16, will be forced downwardly and forwardly through the foremost leg of the slot, whereas the opposite arm 19 will move downwardly and rearwardly through the rearmost leg of the opposite slot 17. The shaft 8 will thus be depressed against the action of the supporting spring 14 and will also be rotated in counter-clockwise direction (looking downward). The shaft may be given a semi-rotation in the opposite direction and may be thrust downward, after the pedal device has resumed its inoperative position, by depressing the left hand foot-hold 25 of the pedal, so that the corresponding arm 19 will sink through the forward leg of the slot 17, the opposite arm 18 being moved downwardly through the rearmost leg of the slot 16 in the right side of the casing.

A horizontally movable supporting member 26 is mounted upon the top plate 13 of the casing and is provided with a circular opening 27 slidably receiving the protruding upper end of the shaft 8. A radial lug 28 is formed upon the said supporting member and projects into the opening 27 for engagement within a longitudinal groove 29 formed in the shaft. The supporting member is thus mounted for limited rotary movement with the shaft but is secured against vertical movement therewith by means of the supporting plate 13 and the overlying limiting member 30, which is substantially U-shaped and is mounted in parallel relation to the upper face of the plate 13 upon its terminal legs 31, which are engaged within diametrically opposite openings 32 in the said plate. The legs 31 of the limiting member also limit the horizontal movement of the supporting member 26 to a semi-rotation. An upwardly projecting standard 33 is provided upon the outer end of the supporting member 26 and has its upper end pivotally connected by means of a transverse pin 34 within the slot 35 provided in the lower end of a whip-holding member 36. This holder is provided with a vertical socket 37 opening through its upper end in which the butt of a whip, such as is indicated by the numeral 38, is adapted to be mounted. A transversely curved clamping jaw 39 is mounted adjustably within the whip socket and is adapted to be adjusted radially for securing engagement with the whip butt by means of an adjusting screw 40. A radial opening is provided in the holding member 36 in communication with the lower end of the socket 37 for slidable reception of a guide arm 42 which projects outwardly from the lower end of the clamping jaw. A forwardly extending connecting rod 44 is engaged detachably within a threaded opening in the whip-holding member. The forward end of this rod extends into a slot 45 provided in the upper end of the operating shaft and is pivotally connected with the said shaft by means of a transverse pin 46.

The operation of the device will now be described. Assuming that the vehicle is being driven with a single horse, or other draft animal, and that it is desired to whip the horse upon the left side, the right hand foot-hold of the pedal is depressed by the driver's foot, whereupon the operating shaft will move downwardly and will, at the same time, rotate partially in counter-clockwise direction, thus turning the supporting member 26 in the last-named direction and drawing the connecting rod downwardly so as to tilt the whip-holding member upon its pivot. The whip mounted within the holding member consequently will be caused to descend in a forward direction at the same time swinging to the left so as to impart a slashing blow to the left flank of the animal. This operation may be repeated by alternately releasing and depressing the right hand foot-hold of the pedal, or, if the driver wants to strike the opposite flank of the animal, he may do so by operating the left hand foot-hold in like manner. The whip will always be maintained in upright position when inoperative by the spring 14.

From the foregoing description, taken in connection with the accompanying drawings, it should be apparent that I have provided a whip-operating device which should prove to be a very useful and desirable article for use by drivers of vehicles, by the use of which they may be enabled to grasp the driving reins at all times with both hands, without having to reach for the whip, whenever it is desired to increase the speed of the draft animal.

The device also serves to secure the whip against ready removal by unauthorized persons, and various other advantages to be derived from the use of such a device should be apparent to persons familiar with the art to which this invention relates.

It is to be understood, however, that minor changes in the shape and construction of the casing or other parts of the device, such as fall within the scope of the appended claims, may be resorted to from time to time in practice if found necessary.

What is claimed is:

1. A whip-operating device comprising a body, a vertical shaft rotatably and slidably mounted within the body, a supporting member mounted upon the body for horizontal swinging movement and being provided with an opening slidably receiving the shaft, means for preventing relative rotation of the supporting member on the shaft, means for securing the supporting member against vertical movement upon the body, a whip-holding member pivotally mounted upon the supporting member for vertical movement thereon, means for connecting the said holding member pivotally with the shaft, and means by which the shaft may be depressed and given a semi-rotation in one direction.

2. A whip-operating device comprising a body, a vertical shaft rotatably and slidably mounted within the body, a supporting member mounted upon the body for horizontal swinging movement and being provided with an opening slidably receiving the shaft, means for preventing relative rotation of the supporting member on the shaft, means for securing the supporting member against vertical movement upon the body, a whip-holding member pivotally mounted upon the supporting member for vertical movement thereon, means for connecting the said holding member pivotally with the shaft, means by which the shaft may be depressed and given a semi-rotation in one direction, and means by which the shaft may be depressed and given a semi-rotation in the opposite direction.

3. A whip-operating device comprising a body, a vertical shaft rotatably and slidably mounted within the body, a supporting member mounted upon the body for horizontal swinging movement and being provided with an opening slidably receiving the shaft, means for preventing relative rotation of the supporting member on the shaft, means for securing the supporting member against vertical movement upon the body, a whip-holding member pivotally mounted upon the supporting member for vertical movement thereon, means for connecting the said holding member pivotally with the shaft, means by which the shaft may be depressed and given a semi-rotation in one direction, and yieldable means for normally sustaining the said shaft in elevated inoperative position.

4. A whip-operating device comprising a body, a vertical shaft rotatably and slidably mounted within the body, a supporting member mounted upon the body for horizontal swinging movement and being provided with an opening slidably receiving the shaft, means for preventing relative rotation of the supporting member on the shaft, means for securing the supporting member against vertical movement upon the body, a whip-holding member pivotally mounted upon the supporting member for vertical movement thereon, means for connecting the said holding member pivotally with the shaft, the body of the device being in the form of a hollow cylindrical casing arranged concentric to the shaft and being provided with a spirally arranged slot therein, and pedal fixedly connected with the shaft and including a radial arm projecting outwardly from the body through the slot.

5. A whip-operating device comprising a body, a vertical shaft rotatably and slidably mounted within the body, a supporting member mounted upon the body for horizontal swinging movement and being provided with an opening slidably receiving the shaft, means for preventing relative rotation of the supporting member on the shaft, means for securing the supporting member against vertical movement upon the body, a whip-holding member pivotally mounted upon the supporting member for vertical movement thereon, means for connecting the said holding member pivotally with the shaft, the body of the device being in the form of a hollow cylindrical casing arranged concentric to the shaft and being provided with inverted V-shaped slots in diametrically opposite sides thereof in alinement with each other, and a pedal device mounted fixedly upon the shaft and including oppositely projecting arms extending through the respective body slots for movement therethrough.

6. A whip-operating device comprising a body, a vertical shaft rotatably and slidably mounted within the body, a supporting member mounted upon the body for horizontal swinging movement and being provided with an opening slidably receiving the shaft, means for preventing relative rotation of the supporting member on the shaft, means for securing the supporting member against vertical movement upon the body, a whip-holding member pivotally mounted upon the supporting member for vertical movement thereon, means for connecting the said holding member pivotally with the shaft, the body of the device being in the form of a hollow cylindrical casing arranged concentric to the shaft and being provided with inverted V-shaped slots in diametrically opposite sides thereof in alinement with each other, a pedal device mounted fixedly upon the shaft and including oppositely projecting arms extending through the respective body slots for movement therethrough, and resilient means for supporting the said shaft normally in its inoperative position with the pedal arms in the apices of the body slots.

In testimony whereof I affix my signature in presence of two witnesses.

AUGUSTE JOSEPH CHANUT.

Witnesses:
B. S. DERMODY,
P. S. DOAN.

Copies of this patent may be obtained for five cents each, by addressing the "Commissioner of Patents, Washington, D. C."